(12) United States Patent
Troulis (10) Patent No.: US 7,218,693 B2
(45) Date of Patent: May 15, 2007

(54) METHOD AND APPARATUS FOR CHANNEL ESTIMATION IN A PACKET BASED TRANSMISSION SYSTEM HAVING REDUCED COMPLEXITY

(75) Inventor: Markos G. Troulis, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 854 days.

(21) Appl. No.: 10/431,772

(22) Filed: May 8, 2003

(65) Prior Publication Data

US 2004/0233839 A1 Nov. 25, 2004

(51) Int. Cl.
- H03K 5/01 (2006.01)
- H03K 5/159 (2006.01)
- G06F 17/10 (2006.01)
- G05B 13/02 (2006.01)

(52) U.S. Cl. .................. 375/346; 375/232; 708/323; 700/52

(58) Field of Classification Search ............ 375/148, 375/220, 235, 346, 232; 370/210; 708/323; 700/52

See application file for complete search history.

(56) References Cited

U.S. PATENT DOCUMENTS

| | | | |
|---|---|---|---|
| 5,204,878 A | 4/1993 | Larsson | 375/14 |
| 5,345,440 A | 9/1994 | Gledhill | 370/19 |
| 5,479,446 A | 12/1995 | Mourot | 375/243 |
| 5,912,876 A | 6/1999 | H'mimy | 370/210 |
| 6,408,022 B1 | 6/2002 | Fertner | 375/230 |
| 6,449,246 B1 | 9/2002 | Barton et al. | 370/210 |
| 6,487,253 B1 | 11/2002 | Jones, IV et al. | 375/260 |
| 2004/0233839 A1* | 11/2004 | Troulis | 370/210 |
| 2005/0025267 A1* | 2/2005 | Reznik et al. | 375/346 |

OTHER PUBLICATIONS

A Reduced Complexity Channel Estimation for OFDM Systems with Transmit Diversity in Mobile Wireless Channels, Minn et al., IEEE Transactions on Communications, vol. 50, May 2002, pp. 799-807.

A Novel Channel Estimation Method for OFDM Mobile Communication Systems Based on Pilot Signals & Transform-Domain Processing, Zhao et al, 1997 IEEE, pp. 2089-2093.

Time versus Frequency Domain Channel Estimation for OFDM Systems with antenna Arrays, Cheng et al., Swiss Federal Institute of Technology.

* cited by examiner

Primary Examiner—David C. Payne
Assistant Examiner—Aslan Ettehadieh
(74) Attorney, Agent, or Firm—Steven A. Shaw; W. James Brady; Frederick J. Telecky, Jr.

(57) ABSTRACT

A method and apparatus for deriving the channel estimation within a packet based transmission system having a predetermined number of tones (N), wherein each channel has a channel order (L). A first method includes precomputing, from the long sequence (X) of a received signal, a channel estimation matrix ($R^{-1}$) having a dimension of width and length equal to the channel order (L) and storing one fourth of the channel estimation matrix ($R^{-1}$) since the channel estimation matrix ($R^{-1}$) is centrosymmetric. Advantageously, precomputing and storing a fourth of the channel estimation matrix ($R^{-1}$) saves time and complexity.

In a second method, the bit-width requirement for fixed precision requirements regarding implementation in hardware is reduced wherein a channel estimation matrix (G) having dimension of width equal to the number of tones (N) and length equal to the channel order (L) is precomputed and stored. Thereby, not only has the task of precomputing and storing the channel estimation matrix (G) saved time and complexity, but also the bit-width requirement for fixed precision implementation in hardware has been lowered.

6 Claims, 7 Drawing Sheets

METHOD AND APPARATUS FOR CHANNEL ESTIMATION IN A PACKET BASED TRANSMISSION SYSTEM HAVING REDUCED COMPLEXITY

FIELD OF THE INVENTION

The present invention relates to packet based transmission systems, and, more particularly, to an efficient method and apparatus for estimating the channel impulse response or the frequency response of a communication channel in a packet based transmission system.

BACKGROUND OF THE INVENTION

The world-wide growth of spectrally efficient communications systems and the enhancement of their performance has increased the number of individual users and data transmission rates for these systems. Packet-based communication systems whose physical layers are based on multi-carrier modulation are commonly referred to as OFDM (Orthogonal Frequency Division Multiplexing) or DMT (Discrete MultiTone) systems. The available transmission channel bandwidth within an OFDM system is subdivided into a number of discrete sub-channels or carriers. Even though these sub-channels overlap, they are orthogonal to each other. Data is transmitted in the form of symbols that have a predetermined duration and encompass some number of carrier frequencies. Systems in compliance with IEEE 802.11a and 802.11g wireless LAN standards are well-known examples of such systems.

The conventional structure of packets in a packet-based data transmission system comprises a preamble, a signal and a data field. The preamble serves to provide boundary detection, channel estimation, carrier recovery. In addition, the preamble serves to initialize the algorithms in the receiver to process the signal and extract the information. The signal field mainly describes the rate of the data and the number of OFDM symbols that follow. Finally, the data field contains the actual OFDM symbols carrying the useful information.

The preamble includes a short and long sequence field, each serving a specific purpose. The short sequence consists of an OFDM symbol repeated two and a half times is used for signal detection, automatic gain control (AGC) setting, coarse frequency offset, and timing synchronization. The long sequence consists also of an OFDM symbol differing from the one in the short sequence. It is repeated two and a half times and is used for channel and fine frequency-offset estimation. Both the long and short sequences have the same duration of 8 μs.

The long sequence X of the preamble is used to estimate the channel frequency response. More particularly, long sequence X is used to estimate the channel where the channel estimation equals:

$$\hat{H}=F(F^H\tilde{D}^H\tilde{D}F)^{-1}F^H\tilde{D}V. \qquad [1]$$

Vector V is the Discrete Fourier Transform (DFT) of the convolution of the discrete time channel impulse response h[n] and the discrete time signal sequence u[n]. Matrix $\tilde{D}$ is a N×N diagonal matrix, whose diagonal equals the long sequence X. Matrix $\tilde{D}^H$ is the Hermitian of matrix $\tilde{D}$, wherein Hermitian is the conjugate transpose. Matrix $F^H$ is the Hermitian of Discrete Fourier Transform (DFT) matrix F.

Long sequence X is known in advance and is transmitted to probe for the channel. Thus, matrix $\tilde{D}$ is known in advance. Matrix Q equals:

$$Q=F(F^H\tilde{D}^H\tilde{D}F)^{-1}F^H\tilde{d} \qquad [2]$$

Matrix R is a real, Toeplitz and symmetric L×L matrix that equals:

$$R=F^H\tilde{D}^H\tilde{D}F \qquad [3]$$

using matrix R, matrix Q reduces to:

$$Q=FR^{-1}F^H\tilde{D}. \qquad [4]$$

Matrix $R^{-1}$ is a real and symmetric matrix. In addition, matrix $R^{-1}$ is symmetric along its antidiagonal from its Southwest element to its Northeast element, and is, therefore, persymmetric. A symmetric matrix that is persymmetric is known as a centrosymmetric matrix. Thus, matrix $R^{-1}$ is a real and centrosymmetric matrix.

Conventionally, matrix Q is precomputed and stored in a read accessible memory (RAM). Thus, when the observation vector, V, is available, only a matrix vector multiplication is necessary to estimate the channel quality. Unfortunately, matrix Q contains $N^2$ complex numbers. Thus, in systems in compliance with IEEE 802.11a and 802.11g wireless LAN standards where for N=64, four thousand ninety six complex numbers must be stored for a 10 bit word length and, as a result, approximately 10 k bytes of RAM are required. The multiplication of matrix Q with vector V requires $N^2$ complex multiplications which are equivalent to $4N^2$ real multiplications. As a result, a complexity of 16,384 real multiplications exists.

Thereby, a significant complexity exists using the conventional method. More particularly, the number of the tones that are significant when calculating the channel estimation metric are substantially less than the total number of tones. Thus, there is a need for an alternate way of computing the channel estimation metric that provides a more simple, cost effective approach over that which is conventional.

The present invention is directed to overcoming, or at least reducing the effects of one or more of the problems set forth above.

SUMMARY OF THE INVENTION

To address the above-discussed deficiencies of transceivers within packet based transmission systems, the present invention teaches a method for deriving the channel estimation for a packet based transmission system having a predetermined number of tones N, wherein the channel has a channel order L. The first step in the method includes precomputing and storing at least one channel estimation matrix $R^{-1}$ which equals $(F^H\tilde{D}^H\tilde{D}F)^{-1}$ having dimension of width and length equal to the channel order L, where matrix F is a Fourier transform matrix and matrix $\tilde{D}$ is a matrix having the long sequence X as its diagonal while all other elements equal zero. Since the long sequence X is known and determined by the standards committee that the transceiver is compliant with, the channel estimation $R^{-1}$ may be calculated and stored prior to receiving the incoming signal. In addition, since the channel estimation matrix $R^{-1}$ is centrosymmetric, only one fourth of the elements must be stored to regenerate the channel estimation matrix $R^{-1}$. The next step includes detecting a continuous time signal from a transmitting device. In an additional step, the continuous time signal is converted to a digital signal. The next step includes transforming the digital signal into a frequency domain vector V of digital signal using a Fourier transform filtering means. Furthermore, the matrix $\tilde{D}$ is multiplied by the frequency domain vector V to provide a vector S in another step. Following, the inverse discrete Fourier transform of the vector S is calculated. Next, a group of elements equal to the first predetermined length L is selected to provide a complex vector having length equal to the first predetermined length L. Following, at least one of the channel estimation matrix $R^{-1}$ having dimension of width and length equal to the channel order L is regenerated from the previously stored elements. Furthermore, in another step the precomputed matrix $R^{-1}$ is multiplied by the complex vector to produce a first product. Finally, the Fourier transform of the first product is calculated to produce the frequency estimated channel.

In another embodiment, a second method may be employed where at least one first matrix $R^{-1}$ is precomputed and stored. In another step, the first matrix $R^{-1}$ is zero-padded such that a zero-padded matrix $R_Z^{-1}$ is produced that includes the dimensions of width equal to the predetermined number of tones N and length equal to the channel order L. A diagonal matrix K having dimension of width and length equal to the predetermined number of tones N is generated in a next step where the main diagonal is equal to one arbitrary number "s", followed by a first predetermined number of "1"s, followed by a second predetermined number of "s"s, and, finally, followed by third predetermined number of "1"s. In another step, a circulant matrix C having dimension of width and length equal to the predetermined number of tones N includes a column equal to the IFFT of the diagonal of matrix K. In a following step, the circulant matrix C is multiplied by the zero-padded matrix $R_Z^{-1}$ to produce channel estimation matrix G having dimensions of a width equal to the number of tones N and a length equal to the channel order L. The next step includes detecting a continuous time signal from a transmitting device. In an additional step, the continuous time signal is converted to a digital signal. The next step includes transforming the digital signal into a frequency domain vector V of digital signal using a Fourier transform filtering means. Furthermore, the matrix $\tilde{D}$ is multiplied by the frequency domain vector V to provide a vector S in another step. Following, the inverse discrete Fourier transform of the vector S is calculated. Next, a group of elements equal to the first predetermined length L is selected to provide a complex vector having length equal to the first predetermined length L. Following, channel estimation matrix G is regenerated and multiplied by the complex vector to produce a first product. Finally, the Fourier transform of the first product is calculated to produce the channel estimation.

These processes may be implemented in a transceiver, baseband processor or a channel quality estimation module incorporated within a packet based transmission system. More specifically, these processes may be implemented in a packet based transmission system in compliance with the IEEE standard 802.11 (a), (b) and (g).

Advantages of this design include but are not limited to a method and apparatus for estimating the channel estimation that has reduced complexity in the chip architecture, increased power efficiency and less storage requirements. Specifically, the first method substantially reduces the number of multiplications required to calculate the channel estimation by 85% and reduces the storage space requirements by 97% using 18 bits of fixed point precision. The second method reduces the number of multiplications required to calculate the channel estimation by 71.5% and reduces the storage space requirements by 70% using 10 bits of fixed point precision.

These and other features and advantages of the present invention will be understood upon consideration of he following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

The present invention is best understood by comparison with the prior art. Hence, this detailed description begins with a discussion of a known method for calculating the channel estimation.

The long sequence part X of the preamble is used to estimate the channel frequency response. When considering the complex envelope of the actually transmitted complex signal, centered around f=0 occupying a bandwidth, for example, from −10 MHz to 10 MHz, each of the signal's 64 sub-carriers include spacing of Δf=20 MHz/64=312.5 kHz. Not all of the sub-carriers, however, are used to convey information. In packet based transmission systems in compliance with IEEE 802.11a, twelve sub-carriers are not used. Of the remaining 52 sub-carriers, 48 convey information and 4 convey some reference data and are called pilot tones.

The 64 frequency domain samples pass through an inverse discrete Fourier transform (IDFT) and then through a Parallel to Serial (P/S) converter and yield a time domain sequence of 64 samples, having a duration of Ts=1/Δf=3.2 μs. Prefixing these 64 samples with the last 16 samples provides a Guad Interval (GI) and, thereby, provides a GI-extended OFDM symbol whose duration is 3.2 (1+¼)=4

μs. An OFDM and the GI-extended OFDM symbol, however, carry the same amount of information. The GI extended OFDM enables symbol by symbol detection of the OFDM symbols and removes intersymbol interference (ISI) that would otherwise exist between adjacent symbols. Thus, the received signal looks like a circular convolution of the transmitted data in each OFDM symbol. This is critical for packet-based transmission systems that use DFT.

Assuming a discrete time channel impulse response h[n] with length L taps and a discrete time signal sequence u[n] that has the following structure:

$$u[n]=\{x[N/2],x[N/2+1],\ldots,x[N-1],x[0],x[1],\ldots,x[N-1],x[0][x[19,\ldots,x[N-1],\}$$

As shown, sequence u[n] represents the N-long sequence {x[0], . . . , x[N−1]} repeated two and a half times. In systems in compliance with IEEE standard 802.11a, N equals 64, and x[n] is the IDFT of the long sequence, X:

$$X=[0,1, -1, -1, 1, 1, -1, 1, -1, 1, -1, -1, -1, -1,$$
$$-1, 1,1, -1, -1, 1, -1, 1, -1, 1, 1, 1, 1, 0, 0, 0,$$
$$0, 0, 0, 0, 0, 0, 0, 0, 1, 1, -1, -1, 1, 1, -1, 1,$$
$$-1, 1, 1, 1, 1, 1, 1, -1, -1, 1, 1, -, 1, -1, 1, 1,$$
$$1, 1]$$

Previous to u[n] is the short sequence and next to u[n] is the signal field. The transmitted sequence is filtered through the channel h[n] and the output is the linear convolution of u[n] and h[n], assuming a noise-free channel. The focus is now on those samples of the output that depend only on samples of u[n] and not on samples previous to nor after u[n]. The convolution of u[n] and h[n] is denoted by y[n]. Since L is the channel length, the samples y[L−1], . . . , y[5N/2−1] are most significant. This sequence is now referred to as s[n] which is {s[0], s[1], . . . , s[5N/2−L]}. When L≦N/2+1, the last N elements of s[n] and the N elements preceding these last N elements are identical and equal to the circular convolution of x[n] and h[n]. When N/2+1<L≦N, the last N elements of s[n] equals the circular convolution of x[n] and h[n]. The similarity between these two cases is that the last N elements of s[n] is always equal to x[n] convolved with h[n].

The conventional time domain model considers the circular convolution of the x[n] and h[n], where the length of x[n] is N elements and the length of h[n] is L elements, where L≦N. In a matrix-vector form it is expressed as:

$$v=\chi h+z \qquad [1]$$

where $$\chi = \begin{bmatrix} x[0] & x[N-1] & x[N-2] & \cdots & x[N-L+1] \\ x[1] & x[0] & x[N-1] & \cdots & x[N-L+2] \\ x[2] & x[1] & x[0] & \cdots & x[N-L+3] \\ \vdots & \vdots & \vdots & \cdots & \vdots \\ x[N-1] & x[N-2] & x[N-3] & \cdots & x[N-L] \end{bmatrix}$$

Matrix X is the N×L Toeplitz matrix—a truncated circulant matrix, since h[n] is of length L instead of length N. The channel vector, h, has dimension L×1 and the noise vector, z, has the dimension of N×1 where z is assumed to be white and Gaussian (AWGN) with covariance matrix $\sigma_z^2 I$. This model is known in statistics as the linear model. An efficient channel estimation metric exists (i.e. one that attains the Cramer Rao Lower Bound (CRLB)), as follows:

$$\hat{h}=(\chi^T\chi)^{-1}\chi^T v \qquad [2]$$

This estimation metric is unbiased and has the minimum possible variance. It can be shown that for the linear model, this same estimation metric coincides with the Maximum Likelihood (ML) estimation metric and the Least Squares (LS) estimation metric as well. If the noise is colored but Gaussian with a covariance matrix, $C_Z$, then the efficient estimation metric equals:

$$\hat{h}=(\chi^T C_Z^{-1}\chi)^{-1}\chi^T C_Z^{-1} v \qquad [3]$$

Conventionally, the time domain model is converted to a frequency domain model. Circular convolution may be implemented using DFT, therefore it is natural to model the previous situation in the frequency domain. Matrix $F_N$ is a N×N DFT matrix. Thus, multiplying both sides of Equation [1] by matrix $F_N$ yields:

$$V=F_N v=F_N \chi h+F_N z \qquad [4]$$

Recalling that X is a Toeplitz N×L matrix that results from truncating an N×N circulant matrix, due to the fact that h has a length L. Appending (N−L) zeros at the end of h[n] yields the vector $$\tilde{h}=[h^T,0,0,\ldots,0]^T \qquad [5]$$

Thus, vector v may be rewritten as circulant matrix $\tilde{\chi}$ times $\tilde{h}$ plus noise. Since matrix $F_N$ diagonalizes any circulant matrix (i.e. $\tilde{\chi}=F_N^{-1}\tilde{D}F_N$), then Equation [4] may be rewritten as:

$$V = F_N \tilde{\chi}\tilde{h} + F_N z \qquad [6]$$

$$= \tilde{D}F_N \tilde{h} + Z \qquad [7]$$

where matrix $\tilde{D}$ is a N×N diagonal matrix, whose diagonal equals the DFT of the first column of $\tilde{\chi}$ and where vector Z is the DFT of the noise. Thus, the diagonal of $\tilde{D}$ equals X. Defining $\tilde{H}=F_N\tilde{h}$ yields:

$$V=\tilde{D}\tilde{H}+Z \qquad [8]$$

which is a linear model. Since matrix $\tilde{D}$ is square, the optimal estimation metric is:

$$\hat{H}=\tilde{D}^{-1}V \qquad [9]$$

which assumes that matrix $\tilde{D}$ is invertible.

Two problems exist with the above frequency domain model. The first is that matrix $\tilde{D}$ is not invertible. Recall that the diagonal of matrix $\tilde{D}$ equals X and some of these elements are zero. An alternative approach is to focus only on the non-zero elements of matrix $\tilde{D}$. Thus, the channel's frequency response will be estimated at every frequency bin, but only for those bins where data is actually transmitted. The second problem is more serious. By defining:

$$\tilde{H}=F_N\tilde{h} \qquad [10]$$

and using $\tilde{H}$ as the parameter, the important constraint that $\tilde{h}$ must have (N−L) zero elements at the end is lost, or equivalently that $\tilde{h}$ has length L. Therefore, the correct modeling is one that uses h as the unknown parameter and is expressed by:

$$V=\tilde{D}F_N\tilde{h}+Z. \qquad [11]$$

The last (N−L) elements of ĥ are zero, implying that:

$$F_N \tilde{h} = Fh \quad [12]$$

where matrix F is the N×L sub-matrix of matrix $F_N$ that includes the first L columns of matrix $F_N$. The equivalent model in the frequency domain is therefore rewritten as:

$$V = \tilde{D}Fh + Z \quad [13]$$

yielding the optimal estimator for h as:

$$\hat{h} = (F^H \tilde{D}^H \tilde{D} F)^{-1} F^H \tilde{D} V \quad [14]$$

and if we are interested in the frequency responses of ĥ, it equals:

$$\hat{H} = F(F^H \tilde{D}^H \tilde{D} F)^{-1} F^H \tilde{D} V. \quad [15]$$

In Expression [15], it follows that the matrix R:

$$R = F^H \tilde{D}^H \tilde{D} F \quad [16]$$

Further, let vector T be a N×L matrix defined as:

$$T = \begin{bmatrix} I_{L_h} \\ 0_{N-L \times L} \end{bmatrix}, \quad [17]$$

then matrix $F = F_N T$. Substituting into matrix R, yields:

$$R = T^H F_N^H \tilde{D}^H \tilde{D} F_N T. \quad [18]$$

Since matrix $\tilde{D}$ is a diagonal matrix, it follows that:

$$\overline{D} = \overline{D}^H \overline{D} \quad [19]$$

Matrix $\overline{D}$ is a N×N diagonal matrix with real elements and includes the diagonalization property of DFT matrices. In addition, there is a circulant matrix, C, such that:

$$C = F_N^H \overline{D} F_N, \quad [20]$$

where the first column of matrix C will equal N times the IDFT of the diagonal of $\overline{D}$ due to matrix $F_N^H$. Therefore, $$R = T^H C T, \quad [21]$$

which means that matrix R equals the sub-matrix of matrix C, consisting of its first L rows and first L columns.

Specifically, for a packet based transmission system in accordance with IEEE 802.11a, the diagonal of $\overline{D}$ is equal to the squares of the elements of X, which includes 26 ones, followed by (N−53) zeros, followed by 26 ones. Thus, the $C_{m,n}$ element of C equals:

$$C_{m,n} = \frac{2}{N} \left[ \frac{\cos\left(\pi(m-n)\frac{26}{N}\right) \sin\left(\pi(m-n)\frac{27}{N}\right)}{\sin\left(\frac{\pi(m-n)}{N}\right)} - 1 \right], \quad [22]$$

$$m, n = 0, 1, \ldots, N-1$$

Figure 1:
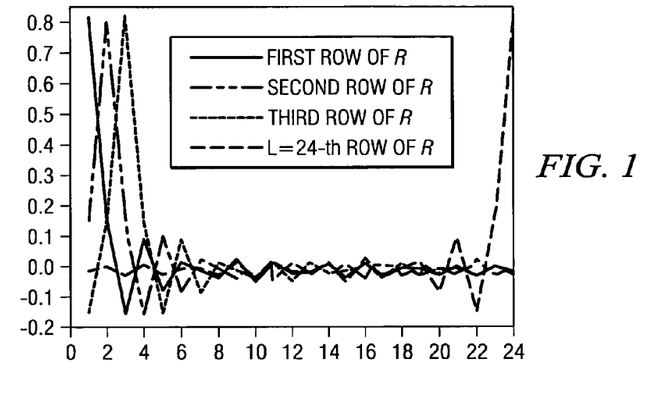
FIG. 1 shows a plot of a few rows of matrix R.
Figure 2:
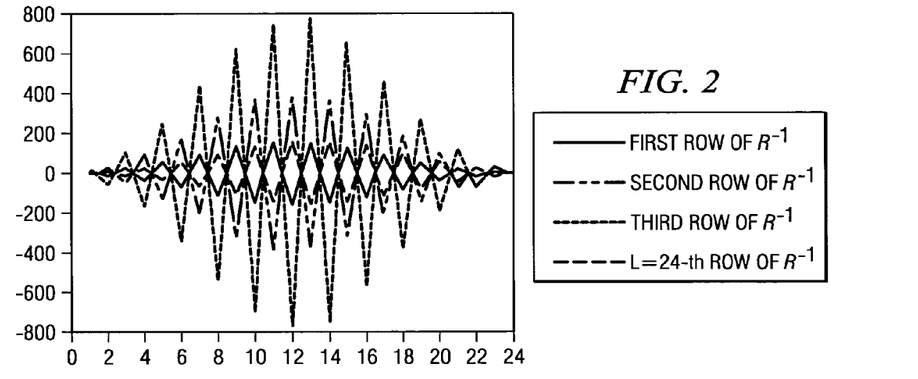
FIG. 2 displays a plot of a few rows of matrix $R^{-1}$.
Figure 3:
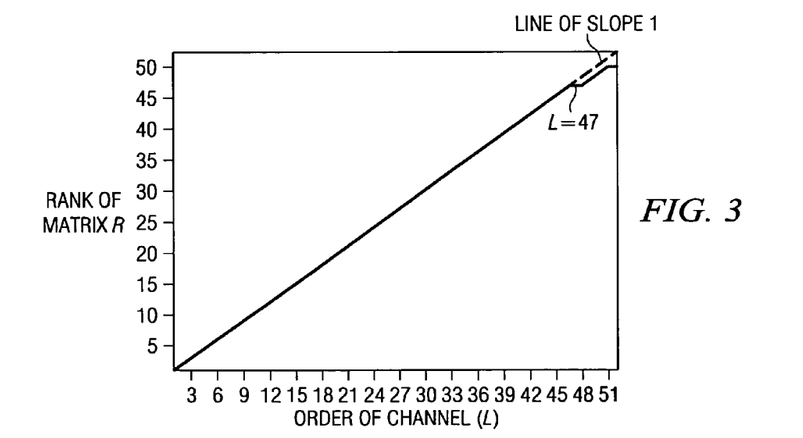
FIG. 3 illustrates a plot of rank of matrix R as a function of channel order L.

Matrix C is circulant and symmetric, implying that matrix R is Toeplitz and symmetric. A Toeplitz matrix is persymmetric. The same is true for matrix $R^{-1}$ which is therefore both symmetric and persymmetric, and hence, centrosymmetric; but, unfortunately, is not Toeplitz. A plot of a few rows of matrix R is shown in FIG. 1. FIG. 2 shows a few rows of the matrix $R^{-1}$. Matrix C has the same rank as the matrix $\overline{D}$ and therefore the rank of matrix $\overline{D}$ equals 2×26=52. Similarly, the rank of the product of $F_N T$ is at most equal to L implying that the rank of matrix R is at most equal to the minimum between L and 52. However, matrix R has dimensions L×L and thus it is invertible only if its rank equals L. Thus, when L>52, matrix R is not invertible; and therefore, h is not identifiable. Therefore, in cases where L≤52, the rank of the associated matrix R when N=64 may be computed. The result is plotted in FIG. 3. Note that N=64 and the maximum channel order that can be estimated is L=47 in contrast to L=52 that would be the maximum possible channel order.

Considering the channel estimate as stipulated in Equation [15], sequence X is known in advance and is transmitted to probe for the channel. Thus, matrix $\tilde{D}$ is known in advance. Matrix Q:

$$Q = F(F^H \tilde{D}^H \tilde{D} F)^{-1} F^H \tilde{D} \quad [23]$$

and using matrix R defined previously, matrix Q reduces to:

$$Q = F R^{-1} F^H \tilde{D}. \quad [24]$$

It has been shown that matrix R is a real, Toeplitz and symmetric L×L matrix. Accordingly, matrix $R^{-1}$ is a real and centrosymmetric matrix. Matrix Q can be precomputed and stored in a RAM. Thus, when the observation matrix, V, is available, only a matrix vector multiplication is necessary to estimate the channel quality. Matrix Q contains $N^2$ complex numbers. Thus for N=64, 4096 complex numbers must be stored, where a 10 bit word length requires about 10 k bytes of RAM. The multiplication of matrix Q with vector V requires $N^2$ complex multiplications which are equivalent to $4N^2$ real multiplications. Thus, for N=64, a complexity of 16,384 real multiplications exists.

The first method in accordance with the present invention for the derivation of the channel estimation focuses only on the channel order L tones of interest. Specifically, regarding a system incompliance with IEEE 801.11a, L equals 52. Thereby, the dimension of matrix Q is reduced to a L×L or a 52×52 complex matrix and vector, V, is reduced to a L×1 or a 52×1 element long complex vector. This means that the storage requirement is reduced to 6.6 Kbytes and the complexity is reduced to 10,816 real multiplications from the known 16,384 real multiplications of the conventional approach.

Figure 4:
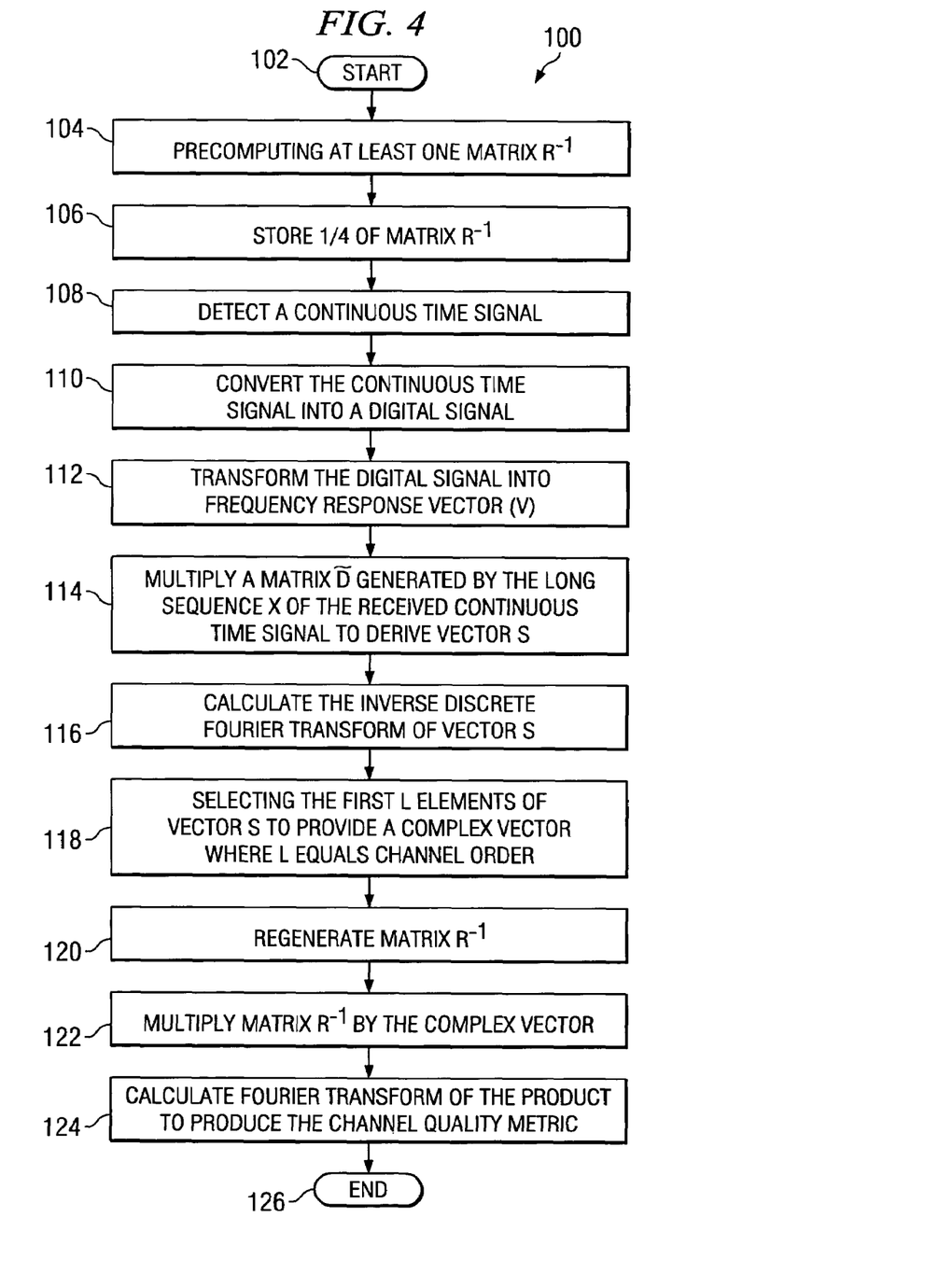
FIG. 4 displays a flow chart of a first process for in accordance with the present invention.

The second method in accordance with the present invention for deriving the channel estimation for a packet based transmission system having a predetermined number of tones N, wherein each channel has a channel order L is illustrated in by a flow chart shown in FIG. 4. The first step 104 in the method includes precomputing and storing at least one first matrix $R^{-1}$ which equals $(F^H \tilde{D}^H \tilde{D} F)^{-1}$ having dimension of width and length equal to the channel order L, where matrix F is a Fourier transform matrix and matrix $\tilde{D}$ is a matrix having the long sequence X as its diagonal while all other elements equal zero. Since the long sequence X is known and predetermined by the data communication standard that the transceiver is compliant with, the first matrix $R^{-1}$ may be calculated and stored prior to receiving the incoming signal. In addition, since the first matrix $R^{-1}$ is centrosymmetric, only $(L+1)^2/4$ elements must be stored to regenerate the first matrix $R^{-1}$ as shown in step 106. The next step 108 includes detecting a continuous time signal from a transmitting device. In an additional step 110, the continuous time signal is converted to a digital signal. The next step 112 includes transforming the digital signal into a frequency domain vector V of digital signal using a Fourier transform filtering means. Furthermore, the matrix $\tilde{D}$ is multiplied by the frequency domain vector V to provide a vector S in another step 114. Following, the inverse discrete Fourier transform of the vector S is calculated in step 116. Next, in step 120, a group of elements equal to the first predetermined length L is selected from the inverse discrete Fourier transform of the vector S to provide a complex vector having length equal to the first predetermined length L. Following, at least one of the first matrix $R^{-1}$ having dimension of width and length equal to the channel order L is regenerated from the $(L+1)^2/4$ stored elements in step 122. Furthermore, in another step 124 the precomputed matrix $R^{-1}$ is multiplied by the complex vector to produce a second product. Finally, in step 126 the Fourier transform of the second product is calculated to produce the frequency estimated channel.

Thus, for example where channel order L equals 24, only 156 real numbers must be stored. Multiplying the L×L real symmetric matrix with the L-long complex vector results, in a complexity of approximately $2L^2$ real multiplications or 1,152 real multiplications. The total complexity if split radix is used is 1,544 or if radix 2 FFT is used is 1,680. The savings in the computation is by a factor of about 6.4 corresponding to 85% savings in the number of multiplications and approximately 97% in the required storage space regarding the precomputed complex matrix of size 52×52.

Figure 5:
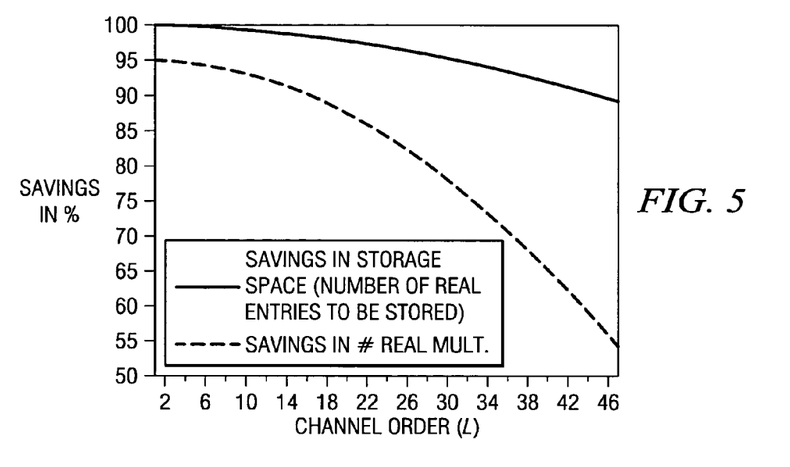
FIG. 5 shows a savings of the number of real multiplications as a function of channel order.

For various values of L=1, . . . , 47 and N=64, the savings in storage and in number of real multiplications, with respect to the method that precomputes the entire Q matrix of size 52×52 are shown in FIG. 5.

Figure 6:
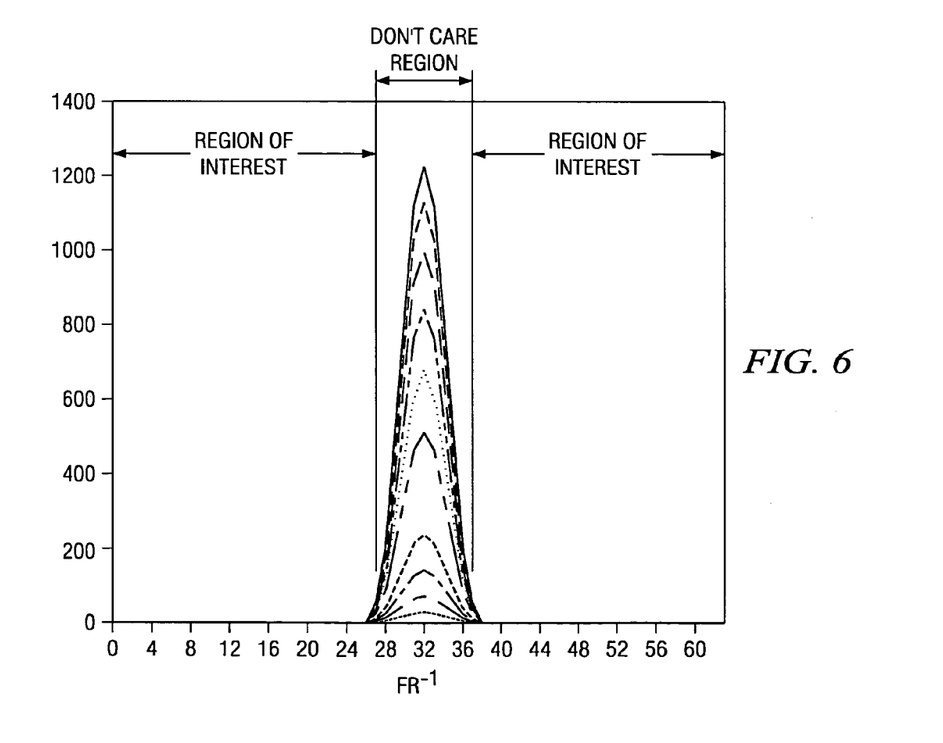
FIG. 6 represents the product $FR^{-1}$.

In evaluating the fixed precision requirements such that the aforementioned method may be implemented in hardware, it was discovered that as much as 18 bits were required to store matrix $R^{-1}$ in a fixed point format. This requirement, however, is disadvantageous despite the lower complexity. Specifically, as shown in FIG. 6, the product $FR^{-1}$ is shown where the resultant matrix has dimensions 64×24 or N×L. As shown in the "don't care" region, the large amplitude is responsible for the large bit width. A matrix G is designed such that:

$$FG=FR^{-1} \quad [25]$$

where the amplitude of the product of FG in the "don't care" region is the same as the region of interest. Matrix K is a N×N or 64×64 diagonal matrix with a main diagonal having one arbitrary element "s", followed by a first predetermined number of "1"s, followed by a second predetermined number of "s"s, and, finally, followed by third predetermined number of "1"s. Specifically, in the case where matrix K is a 64×64 diagonal matrix including a main diagonal having the first arbitrary element "s" followed by 26 "1"s which are followed by eleven arbitrary elements "s" and 26 "1"s, as shown:

$$[s, 1, \ldots, 1, s, \ldots s, 1, \ldots, 1] \quad [26]$$

Figure 7:
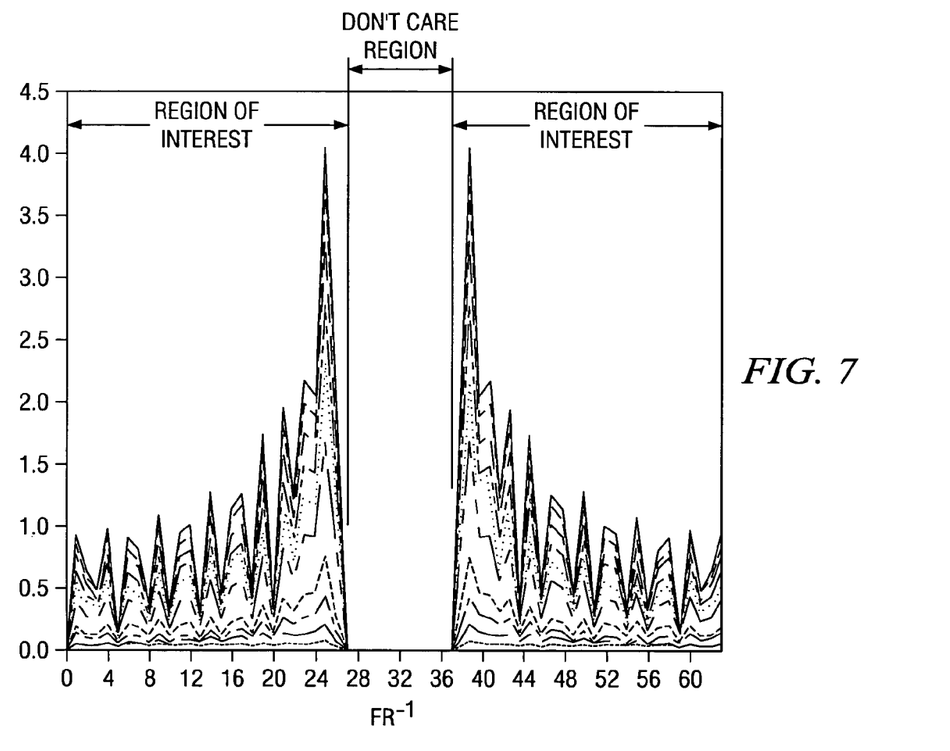
FIG. 7 displays an amplified view of the product of $FR^{-1}$ in FIG. 6.

Zero-padding matrix $R^{-1}$ yields:

$$KFR^{-1} = KF_N R_z^{-1} \quad [27]$$

$$= F_N C R_z^{-1} \quad [28]$$

$$= F_N G \quad [29]$$

where $KF_N=F_N C$ and where matrix C is a circulant matrix having a first column equal to the inverse Fourier Transform (IFFT) of the diagonal of diagonal matrix K which is Hermitian symmetric. Since circulant matrix C is real, it follows that matrix G is real having dimensions of width equal to the number of tones N and length equal to the channel order L. FIG. 7 represents the amplitude of the product of $FR^{-1}$. As shown the values of interest are smaller than those in the "don't care" region by a factor of approximately 300. Selecting the arbitrary element based upon this information, the bit-width requirement will be reduced by 8 bits.

Figure 8:
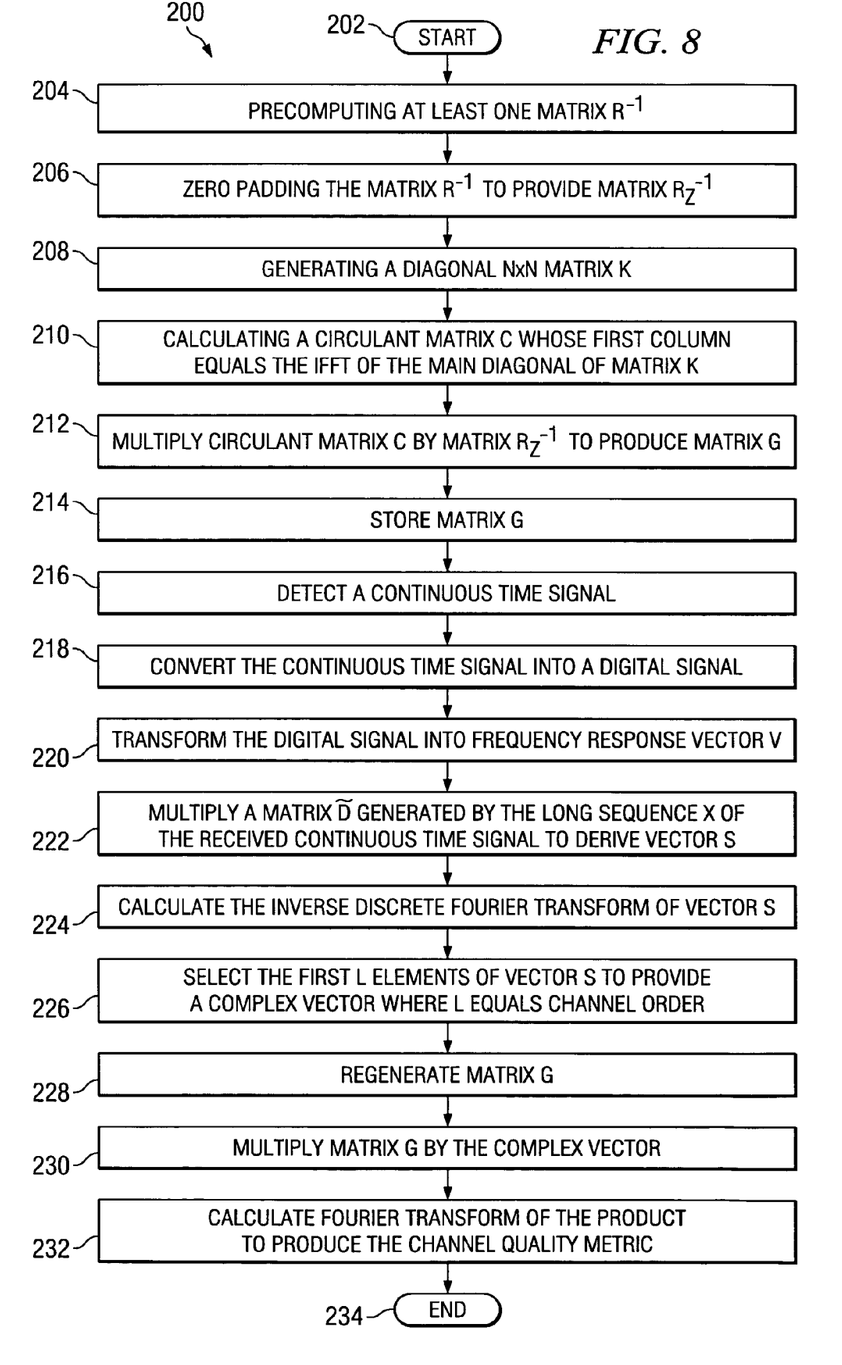
FIG. 8 displays a flow chart of a second process for in accordance with the present invention.

Thus, in an effort to lower the bit-width require, a third method may be employed where in a first step 204 at least one first matrix $R^{-1}$ is precomputed and stored as is shown in FIG. 8. In another step 206, the first matrix $R^{-1}$ is zero-padded such that a zero-padded matrix $R_z^{-1}$ is produced that includes the dimensions of width equal to the predetermined number of tones N and length equal to the channel order L. In another step 208, a N×N diagonal matrix K is generated that includes a main diagonal having one arbitrary element "s", followed by a first predetermined number of "1"s, followed by a second predetermined number of "s"s, followed by third predetermined number of "1"s. A circulant matrix C having dimension of width and length equal to the predetermined number of tones N includes the first column that equals the IFFT of the diagonal of diagonal matrix K in step 210. In a following step 212, the circulant matrix C is multiplied by the zero-padded matrix $R_z^{-1}$ to produce channel estimation matrix G having dimensions of a width equal to the number of tones N and a length equal to the channel order L. The channel estimation matrix G is stored in step 214. The next step 216 includes detecting a continuous time signal from a transmitting device. In an additional step 218, the continuous time signal is converted to a digital signal. The next step 220 includes transforming the digital signal into a frequency domain vector V of digital signal using a Fourier transform filtering means. Furthermore, the matrix D is multiplied by the frequency domain vector V to provide a vector S in another step 222. Following, the inverse discrete Fourier transform of the vector S is calculated in step 224. In an additional step 226, a group of elements equal to the first predetermined length L is selected to provide a complex vector having length equal to the first predetermined length L. Following, in step 228, the channel estimation matrix G is regenerated. Moreover, the channel estimation matrix G is multiplied by the complex vector to produce a second product in step 230. Finally, in step 232, the Fourier transform of the second product is calculated to produce the channel estimation.

Figure 9:
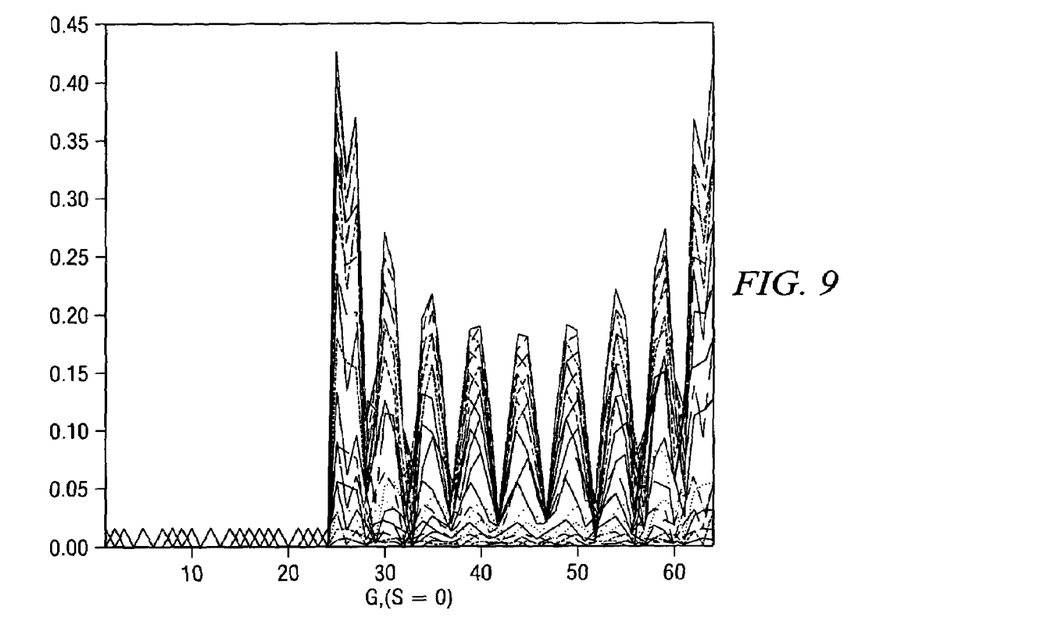
FIG. 9 shows matrix G when s=0.
Figure 10:
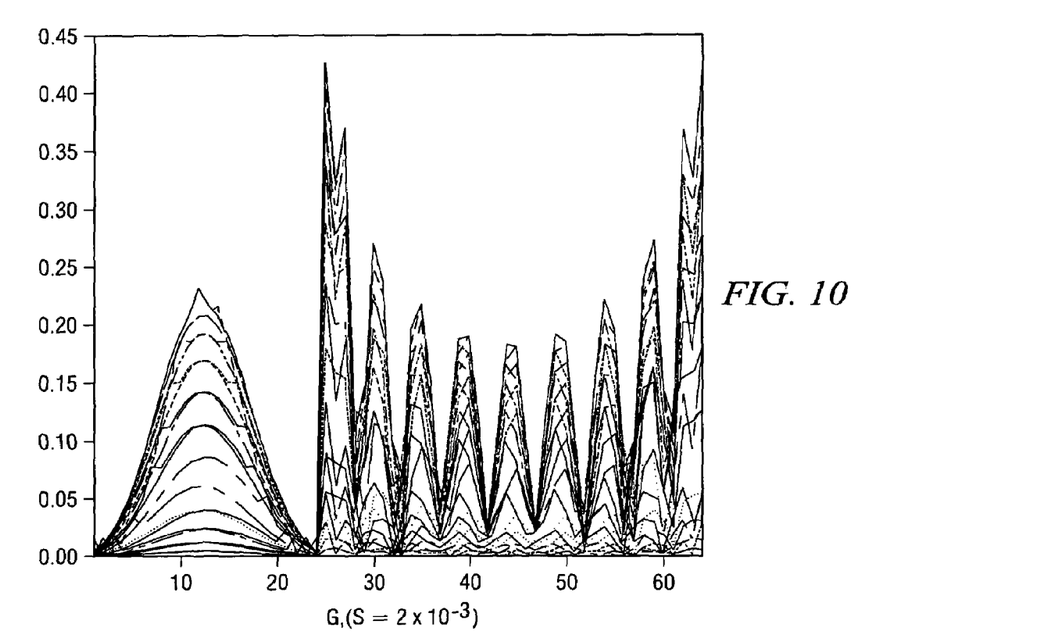
FIG. 10 illustrates matrix G when $s=2 \times 10^{-3}$.
Figure 11:
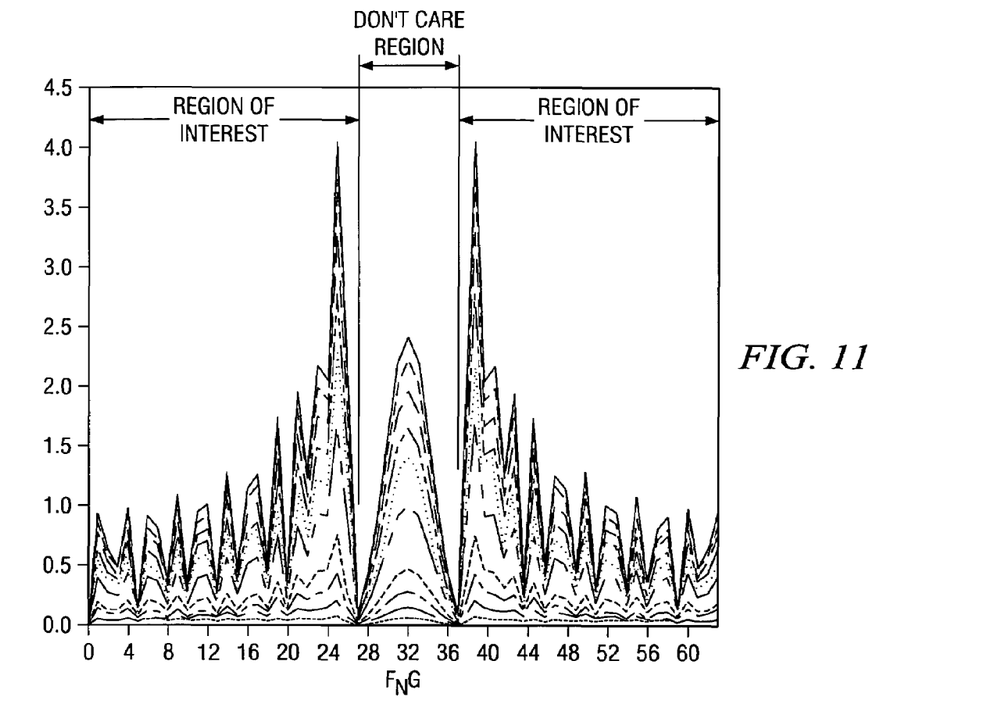
FIG. 11 displays the product of $F_N G$ when $s=2 \times 10^{-3}$.
Figure 12:
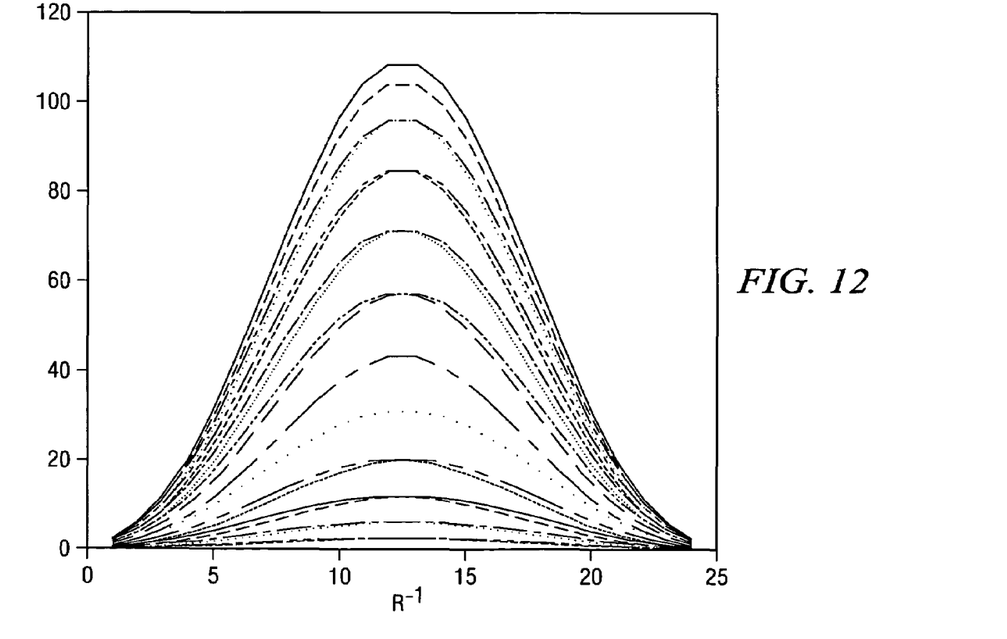
FIG. 12 shows matrix $R^{-1}$.

FIG. 9 illustrates matrix G when the arbitrary element s is 0. FIG. 10 represents the amplitude of matrix G when the arbitrary element s is $2 \times 10^{-3}$. FIG. 11 displays the amplitude for the product of $F_N G$, while FIG. 12 displays matrix $R^{-1}$ as a function of its amplitude. The implication from FIGS. 10 and 12 is that the precision requirement for matrix G is less than that prescribed for matrix $R^{-1}$. Similarly, the implication from FIGS. 11 and 6 is that the product $F_N G$ has a much lower bit-width requirement than the product $FR^{-1}$.

Thus, precomputing the N×L matrix G having real elements is stored using this method. The elements of this matrix may be quantized to 10 bits in twos complement notation. The storage requirements are 1.875 kbytes which is a savings of 70% than the conventional method. The complexity after multiplying the IFFT of the product $F_N G$ is 3,072 real multiplications compared to the 10,816 real multiplications necessary for the conventional method. Thereby, a savings of 71.5% is obtained which is approximately twice the complexity of the first method.

These processes may be implemented in a transceiver, baseband processor or a channel quality estimation module incorporated within a packet based transmission system. More specifically, these processes may be implemented in a packet based transmission system in compliance with the IEEE standard 802.11 (a), (b) and (g).

Advantages of this design include but are not limited to a method and apparatus for estimating the channel estimation that has reduced complexity in the chip architecture, increased power efficiency and less storage requirements. Specifically, the first method substantially reduces the number of multiplications required to calculate the channel estimation by 85% and reduces the storage space requirements by 97% using 18 bits of fixed point precision. The second method reduces the number of multiplications required to calculate the channel estimation by 71.5% and reduces the storage space requirements by 70% using 10 bits of fixed point precision.

An observation regarding the method in accordance with the present invention is that it depends upon the order of the channel. This is explicitly shown by the dimensions of channel estimation matrix G. Therefore, when the channel order is small, the computational complexity is small. Conversely, when the channel order is large, the computational complexity is large. Accordingly, several channel estimation matrices G may be stored having differing associated channel orders wherein the packet based transmission system selects the appropriate matrix to estimate the channel.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method for estimating a channel in a packet based transmission system having a predetermined number of tones (N), wherein the channel has a channel order (L), where L>1, and having a predetermined and stored long sequence (X), comprising the steps of:
    pre-computing at least one channel estimation matrix ($R^{-1}$) which equals $(F^H \tilde{D}^H \tilde{D} F)^{-1}$ having dimension of width and length equal to the channel order (L), where matrix F is a Fourier transform matrix, matrix $\tilde{D}$ is a matrix having the long sequence X as its diagonal while all other elements equal zero, where an Hermitian operator H is a conjuciate transpose, matrix $\tilde{D}^H$ is the Hermitian of matrix $\tilde{D}$, $F^H$ is the Hermitian of Discrete Fourier Transform (DFT) matrix F;
    storing $(L+1)^2/4$ elements of the channel estimation matrix $R^{-1}$ in a storage means;
    detecting a continuous time signal from a transmitting device;
    converting the continuous time signal into a digital signal;
    transforming the digital signal into a frequency domain vector (V) of the digital signal using a discrete Fourier transform filtering means;
    multiply the matrix $\tilde{D}$ by the frequency domain vector (V) to provide a vector (S);
    calculating the inverse discrete Fourier transform of the vector (S);
    selecting from the inverse discrete Fourier transform of vector (S) a grouping of elements equal to the first predetermined length (L) to provide a complex vector having length equal to the first predetermined length (1);
    regenerating one of the at least one channel estimation matrix (R–I) having dimension of width and length equal to the channel order (L) from the $(L+1)^2/4$ stored elements;
    multiplying the precomputed channel estimation matrix ($R^{-1}$) by the complex vector to produce a first product; and
    calculating the discrete Fourier transform of the first product to produce an estimation of the channel.

2. A method as recited in claim 1, wherein the packet based transmission system is in compliance with IEEE 802.11a where the number of tones (N) equals 64 and the channel order (L) equals 47.

3. A method as recited in claim 1, wherein the packet based transmission system is in compliance with IEEE 802.11 a where the number of tones (N) equals 64 and the channel order (L) is less than 47.

4. A method for estimating a channel in a packet based transmission system having a predetermined number of tones (N), wherein the channel has a channel order (L), where L>1, having a predetermined and stored long sequence (X), comprising the steps of:
    pre-computing at least one matrix ($R^{-1}$) from $(F^H \tilde{D}^H \tilde{D} F)^{-1}$ having dimension of width and length equal to the channel order (L), where matrix F is a Fourier transform matrix, matrix $\tilde{D}$ is a matrix having the long sequence X as its diagonal while all other elements equal zero, where an Hermitian operator H is a conjugate transpose, matrix $\tilde{D}^H$ is the Hermitian of matrix $\tilde{D}$ matrix $F^H$ is the Hermitian of Discrete Fourier Transform (DFT) matrix F;
    zero-padding the at least one matrix ($R^{-1}$) such that at least one matrix ($R_Z 1$) is produced having dimensions of width equal to the predetermined number of tones (N) and length equal to the channel order (L);
    generating a diagonal matrix (K) having dimensions of width and length equal to the number of tones (N) and having a main diagonal that includes a first arbitrary element (S) adjacent a first predetermined number of "1"s that is adjacent to a second predetermined number of "s"s that are adjacent to a third predetermined number of "1"s;
    computing a circulant matrix (C) having dimension of width and length equal to the predetermined number of tones (N) where the first column of the circulant matrix (C) equals the IFFT of the diagonal of the diagonal matrix (K);
    multiplying the circulant matrix (C) by the at least one zero-padded matrix ($R_Z^{-1}$) to produce at least one channel estimation matrix (G) having dimensions of width equal to the predetermined number of tones (N) and length equal to the number of channel order (L);
    storing the at least one channel estimation matrix (G) in a storage means;

detecting a continuous time signal from a transmitting device;
detecting the packet of the continuous time signal;
converting the continuous time signal into a digital signal;
transforming the digital signal into a frequency domain vector (V) of digital signal using a discrete Fourier transform filtering means;
multiply the matrix (5) by the frequency domain vector (V) to provide a vector (S);
calculating the inverse discrete Fourier transform of the vector (S);
selecting from the inverse discrete Fourier transform of the vector (S) a grouping of elements equal to the first predetermined length (L) to provide a complex vector having length equal to the first predetermined length (L);
regenerating the at least one channel estimation matrix (G);
multiplying the at least one channel estimation matrix (G) by the complex vector to produce a first product; and
calculating the discrete Fourier transform of the first product to produce an estimation of the channel.

5. A method as recited in claim 4, wherein the packet based transmission system is in compliance with IEEE 802.11a where the number of tones (N) equals 64 and the channel order (L) is less than 47.

6. A method as recited in claim 4, wherein the packet based transmission system is in compliance with IEEE 802.11a where the number of tones (N) equals 64 and the channel order (L) is equal to 47.

* * * * *